United States Patent
Koyama

(10) Patent No.: US 9,219,837 B2
(45) Date of Patent: Dec. 22, 2015

(54) IMAGE READING APPARATUS CAPABLE OF DISPLAYING FOREIGN MATTER POSITION AS IMAGE

(71) Applicant: CANON KABUSHIKI KAISHA, Tokyo (JP)

(72) Inventor: Hayato Koyama, Kashiwa (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/154,254

(22) Filed: Jan. 14, 2014

(65) Prior Publication Data

US 2014/0204433 A1 Jul. 24, 2014

(30) Foreign Application Priority Data

Jan. 22, 2013 (JP) ................. 2013-009252

(51) Int. Cl.
*H04N 1/00* (2006.01)
*H04N 1/10* (2006.01)

(52) U.S. Cl.
CPC ....... *H04N 1/00909* (2013.01); *H04N 1/00477* (2013.01); *H04N 1/1013* (2013.01); *H04N 1/00411* (2013.01)

(58) Field of Classification Search
CPC .......... H04N 1/00411; H04N 1/00477; H04N 1/00909; H04N 1/1013
USPC .......................... 358/496, 474, 406, 463, 3.26
See application file for complete search history.

(56) References Cited

U.S. PATENT DOCUMENTS

| 5,084,760 | A | * | 1/1992 | Hashimoto et al. | 358/300 |
| 6,750,990 | B1 | * | 6/2004 | Ohashi | 358/496 |
| 6,792,161 | B1 | * | 9/2004 | Imaizumi et al. | 382/275 |
| 7,719,726 | B2 | | 5/2010 | Kamei et al. | |
| 2002/0071135 | A1 | * | 6/2002 | Takeda et al. | 358/1.14 |
| 2004/0125412 | A1 | * | 7/2004 | Sugeta | 358/3.26 |
| 2006/0061830 | A1 | * | 3/2006 | Sakakibara | 358/448 |
| 2009/0066831 | A1 | * | 3/2009 | Ikeda | 348/345 |
| 2010/0020369 | A1 | * | 1/2010 | Harada | 358/475 |
| 2014/0177016 | A1 | * | 6/2014 | Wilsher | 358/504 |

* cited by examiner

*Primary Examiner* — Benny Q Tieu
*Assistant Examiner* — Quyen V Ngo
(74) *Attorney, Agent, or Firm* — Rossi, Kimms & McDowell LLP

(57) ABSTRACT

An image reading apparatus that is capable of displaying in detail, as an image, a foreign matter position where an image reading failure could be caused. The image reading apparatus has a main scanning index plate and a sub-scanning index plate disposed adjacent to a reading glass and extending in main scanning and sub-scanning directions. These plates have scales that equally divide a surface of the reading glass in the main scanning and sub-scanning directions. When foreign matter is detected, a foreign matter detection message, a foreign matter area image, and position information representing a foreign matter area position are displayed on an operation panel. Based on the displayed image and position information, a user can easily recognize a cleaning object area on the reading glass surface while referring to the scales of the index plates.

14 Claims, 14 Drawing Sheets

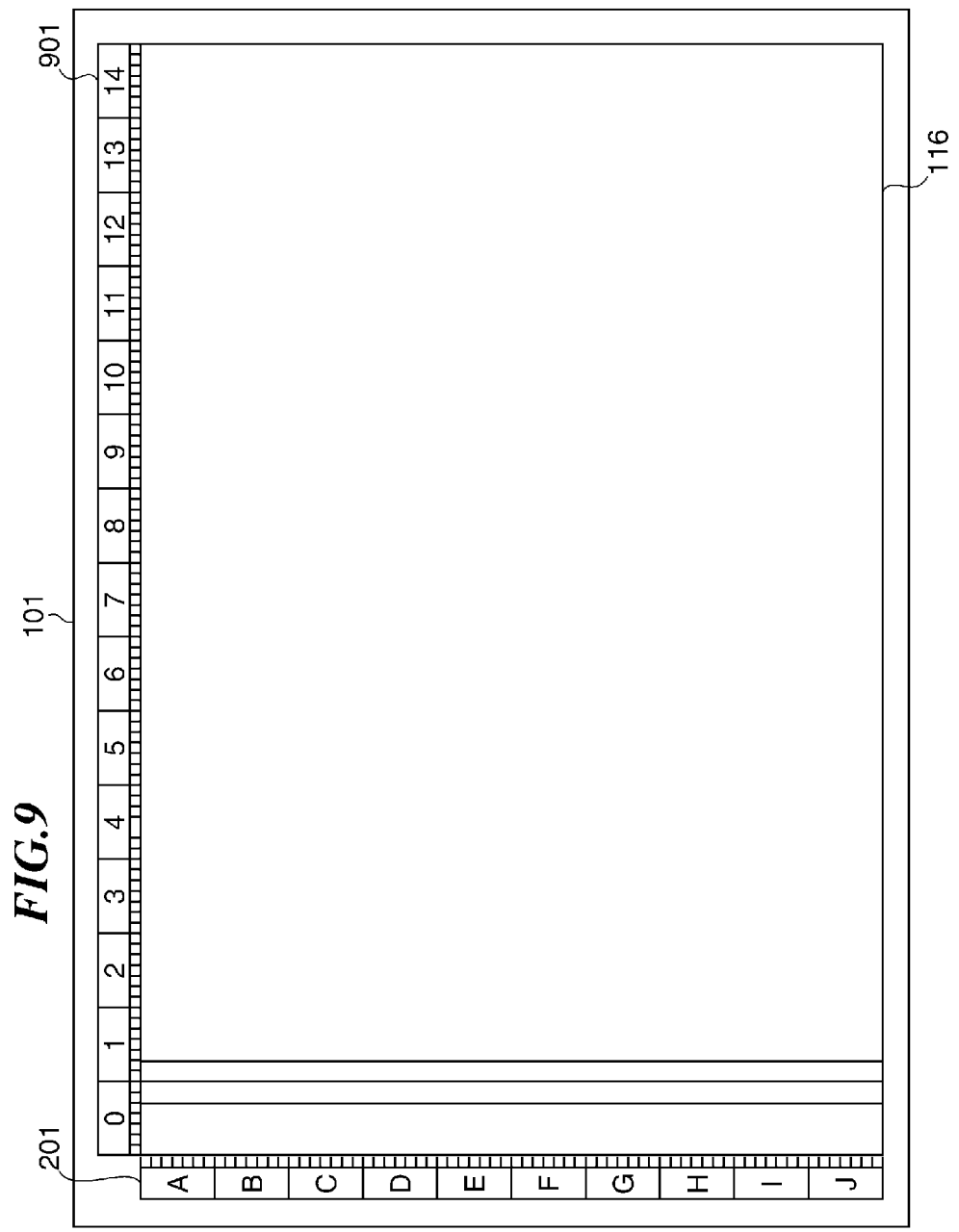

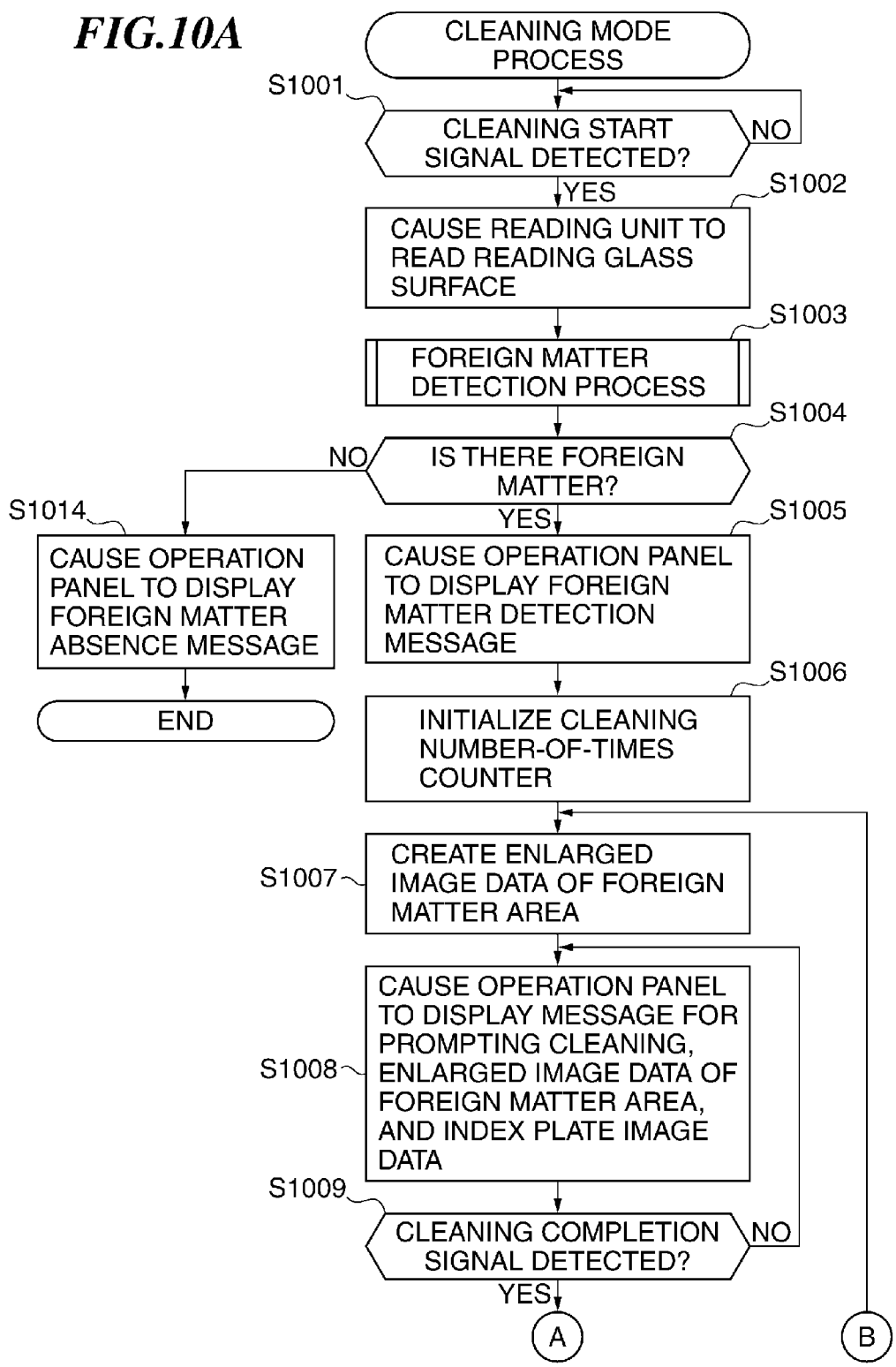

IMAGE READING APPARATUS CAPABLE OF DISPLAYING FOREIGN MATTER POSITION AS IMAGE

BACKGROUND OF THE INVENTION

1. Field of the Invention

The present invention relates to a document reading apparatus capable of displaying, as an image, a foreign matter position.

2. Description of the Related Art

Conventionally, an image reading apparatus (document reading apparatus) has been known that has a flow-reading mode in which an image of an original passing through an original reading position is read by an optical scanning unit that remains stopped at the original reading position, while originals are conveyed one by one along a reading glass by an automatic original feeder. However, if foreign matter such as dust or stain is present at the original reading position on the reading glass, a streak is produced in the read image.

To prevent a streak from being produced in a read image, an image reading apparatus has been proposed that has a foreign matter detection unit for detecting a position of foreign matter on a reading glass (see, for example, U.S. Pat. No. 7,719,726). This image reading apparatus displays a message for prompting cleaning the reading glass when foreign matter is detected, and selectively illuminates a foreign matter detection area of the reading glass when the reading glass is cleaned.

With the above proposed image reading apparatus which certainly has an illumination unit having a plurality of light emitting devices, however, it is difficult to indicate the foreign matter detection area in detail. Accordingly, there is a fear that a user cannot accurately recognize a position of foreign matter based on the illuminated foreign matter detection area.

SUMMARY OF THE INVENTION

The present invention provides an image reading apparatus that is capable of displaying in detail, as an image, a foreign matter position where an image reading failure could be caused.

According to one aspect of this invention, there is provided a document reading apparatus comprising a conveyance unit configured to convey a document, a reading unit configured to read the document conveyed by the conveyance unit on a reading glass and configured to output image data, a foreign matter detection unit configured to detect foreign matter on the reading glass based on the image data output from the reading unit in a state that there is no document on the reading glass, and a display unit configured to provide display for prompting a user to clean the reading glass and display an image based on the image data output from the reading unit in the state, corresponding to a position of the detected foreign matter.

With this invention, a foreign matter position where an image reading failure could be caused can be displayed in detail as an image, whereby the user can efficiently perform an operation of cleaning foreign matter.

Further features of the present invention will become apparent from the following description of exemplary embodiments with reference to the attached drawings.

BRIEF DESCRIPTION OF THE DRAWINGS

FIG. 9 is a plan view showing a main scanning index plate and a sub-scanning index plate that are provided in an image reading apparatus according to a second embodiment;

FIGS. 10A and 10B are a flowchart showing procedures of a cleaning mode process executed by the image reading apparatus of the second embodiment;

DESCRIPTION OF THE EMBODIMENTS

The present invention will now be described in detail below with reference to the drawings showing preferred embodiments thereof.

First Embodiment

Figure 1:
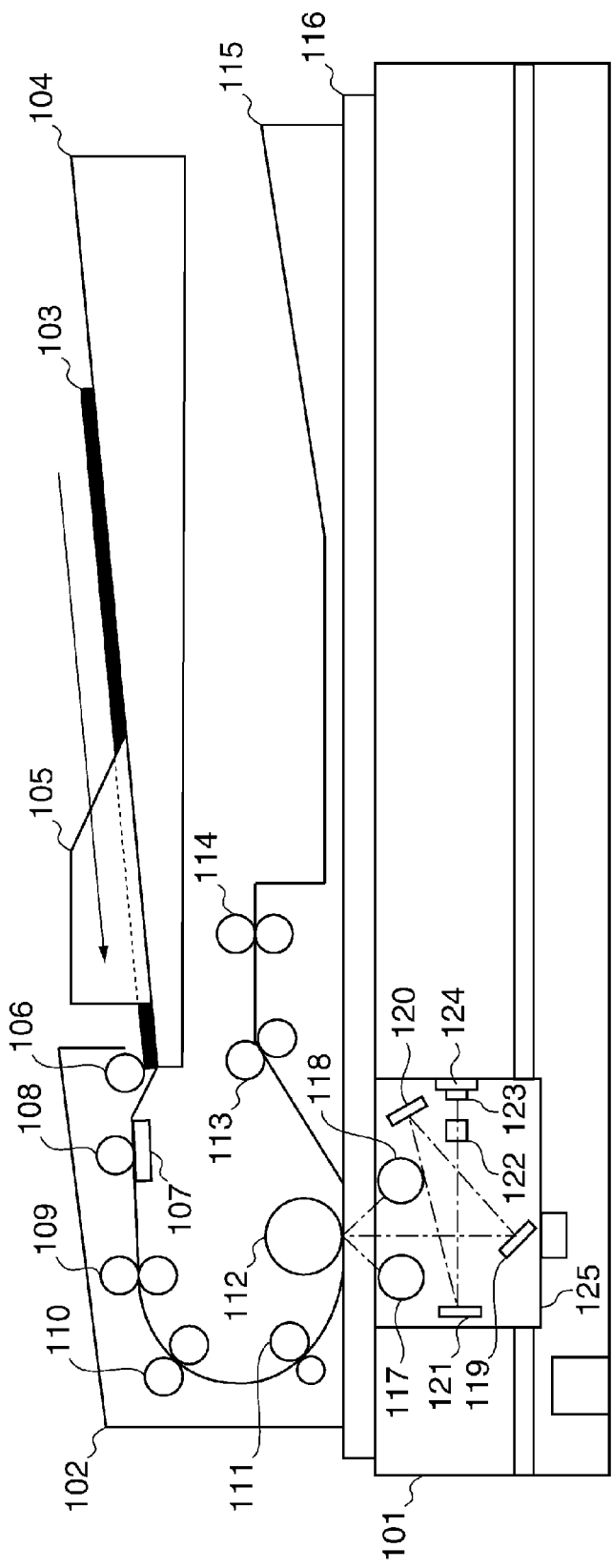
FIG. 1 is a view showing in vertical section the construction of an image reading apparatus according to a first embodiment.
Figure 2:
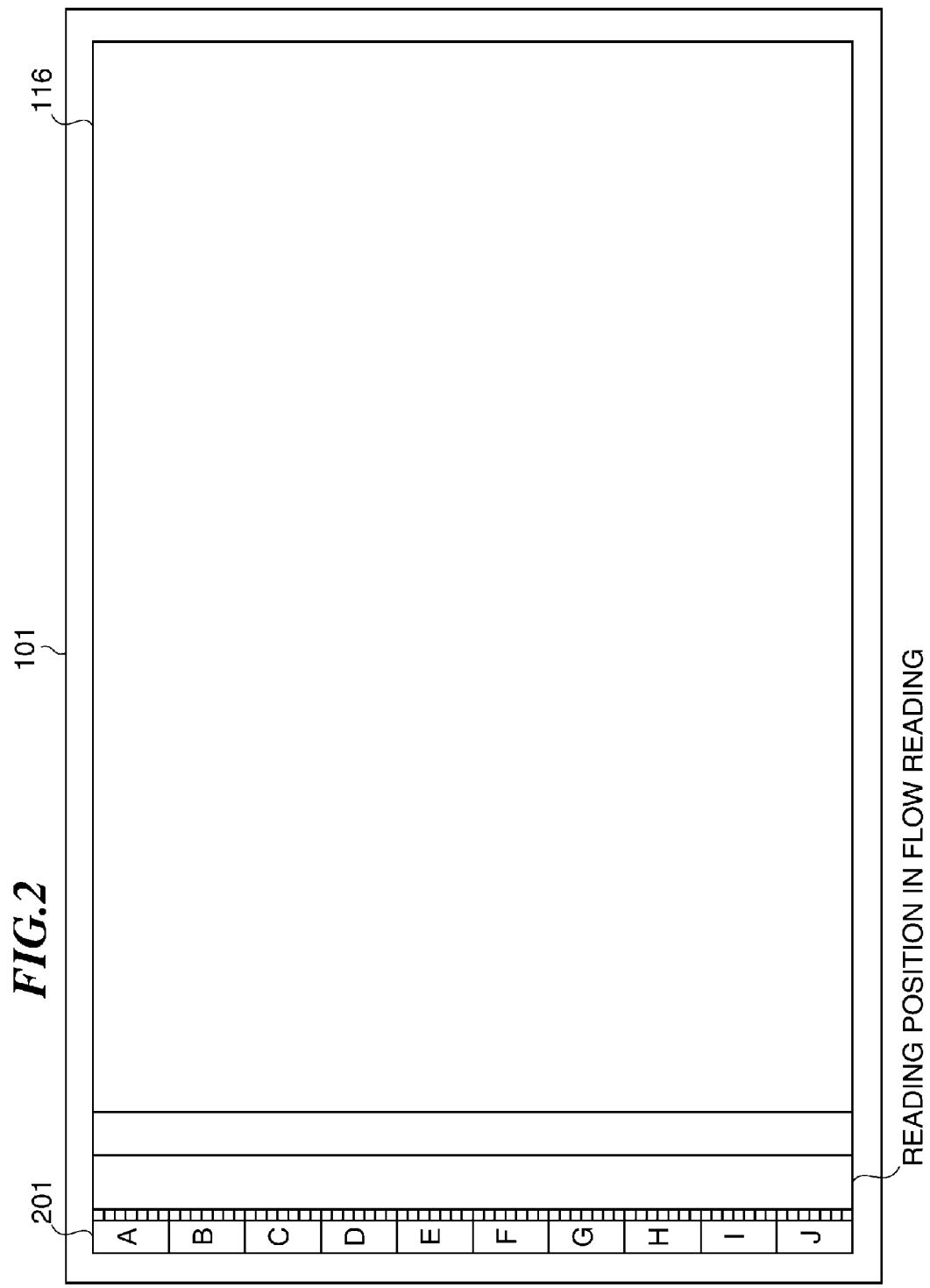
FIG. 2 is a plan view showing a main scanning index plate that is provided on a reading glass of the image reading apparatus.

In the following, a description will be given of an image reading apparatus (document reading apparatus) according to a first embodiment. FIG. 1 shows in vertical section the construction of the image reading apparatus, and FIG. 2 shows in plan view a main scanning index plate that is provided on a reading glass of the image reading apparatus. The image reading apparatus can be configured to be used singly or can be configured to be incorporated into a copying machine, a facsimile machine, or the like.

As shown in FIG. 1, the image reading apparatus has a reader unit 101 for reading an original (document), and an ADF 102 (automatic document feeder) for conveying an original.

The ADF 102 has an original tray 104 on which an original bundle 103 can be placed, a width restriction plate 105 that prevents oblique conveyance of an original, and a pickup roller 106 that feeds an original from the original bundle 103 to a separation part of the ADF 102.

The separation part has a separation pad 107 and a separation roller 108, and separates an uppermost original of the original bundle 103 from the original bundle 103. Oblique conveyance of the separated original is corrected by first and second registration rollers 109, 110. The separated original is conveyed by first to third conveyance rollers 111-113 along a reading glass 116 of the reader unit 101.

When passing through the second conveyance roller 112, the original passes through a reading position beneath the second conveyance roller 112. At that time, an image formed on a surface of the original is read. The original having passed through the third conveyance roller 113 is conveyed by a discharge roller 114 and discharged onto an original discharge tray 115.

As shown in FIG. 2, the reader unit 101 has a main scanning index plate 201 disposed adjacent to a short edge of the reading glass 116 on the side close to the reading position in flow reading. The main scanning index plate 201 extends in a longitudinal direction of the reading glass 116 (i.e., in a main scanning direction).

The main scanning index plate 201 is provided with main scales that equally divide the entire main scanning direction area of the reading glass 116 into a plurality of (e.g., ten) first partial areas A-J, and also provided with auxiliary scales that subdivide the partial areas A-J. A main scanning direction position on the reading glass 116 can be indicated by corresponding ones of the main and auxiliary scales, which serve as a position index array having position indexes. It should be noted that the main and auxiliary scales can be formed on the reading glass 116 instead of providing the main scanning index plate 201.

The image reading apparatus has a flow-reading mode and a fixed-reading mode in each of which the image reading apparatus can read an original.

In the flow-reading mode, light is irradiated from light sources 117, 118 of a reading unit 125 of the reader unit 101 onto an original passing through between the second conveyance roller 112 and the reading glass 116. Reflection light from the original is guided to an imaging lens 122 by reflection mirrors 119-121, is converged by the imaging lens 122, and is received by a line sensor 123. The line sensor 123 photoelectrically converts the received light into an electrical signal and outputs the electrical signal as a read signal to a signal processing circuit 124 (signal processing unit) in which the read signal is converted into a digital signal, which is then subjected to image processing.

In the fixed-reading mode, light is irradiated form the light sources 117, 118 onto an original placed on the reading glass 116 while the reading unit 125 is moved in a sub-scanning direction perpendicular to the main scanning direction. Then, as in the flow-reading mode, reflection light from the original is guided to the imaging lens 122 by the reflection mirrors 119-121, is converged by the imaging lens 122, and is received by the line sensor 123 in which the received light is converted into a read signal. The read signal is converted by the signal processing circuit 124 into a digital signal, which is subjected to image processing.

Figure 3:
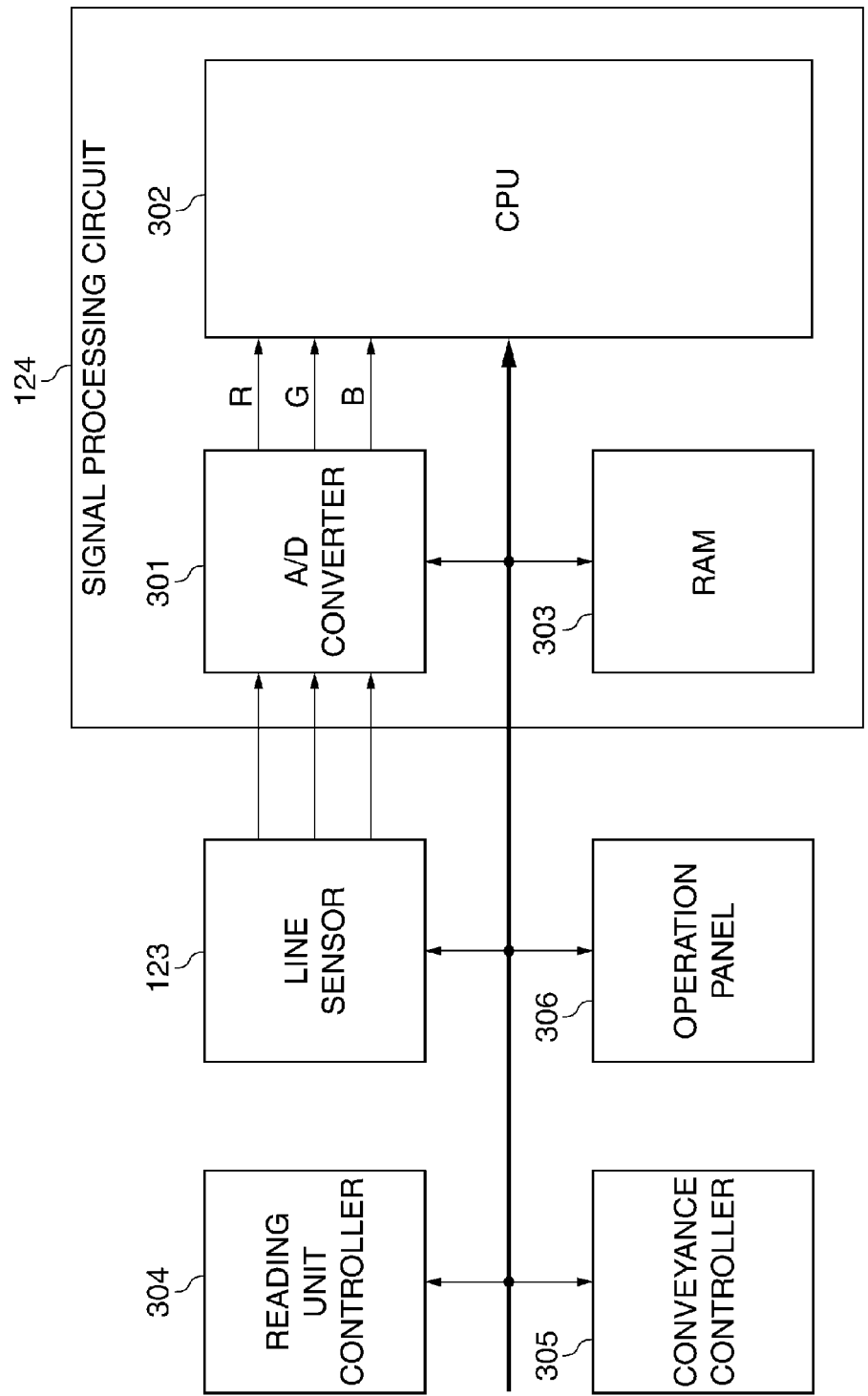
FIG. 3 is a block diagram showing the construction of a signal processing circuit of the image reading apparatus.

FIG. 3 shows in block diagram the construction of the signal processing circuit 124.

As shown in FIG. 3, the signal processing circuit 124 has an A/D converter 301 that converts an electrical signal output from the line sensor 123 into digital image data R, G and B, a CPU 302 that inputs the digital image, and a RAM 303 that stores various data.

The CPU 302 is connected with an A/D converter 301, a RAM 303, a reading unit controller 304, a conveyance controller 305, and an operation panel 306. The CPU 302 controls the respective parts 301-306 of the image reading apparatus, and, as will be described later, performs foreign matter detection based on image data and processes based on a result of the detection.

Figure 4A:
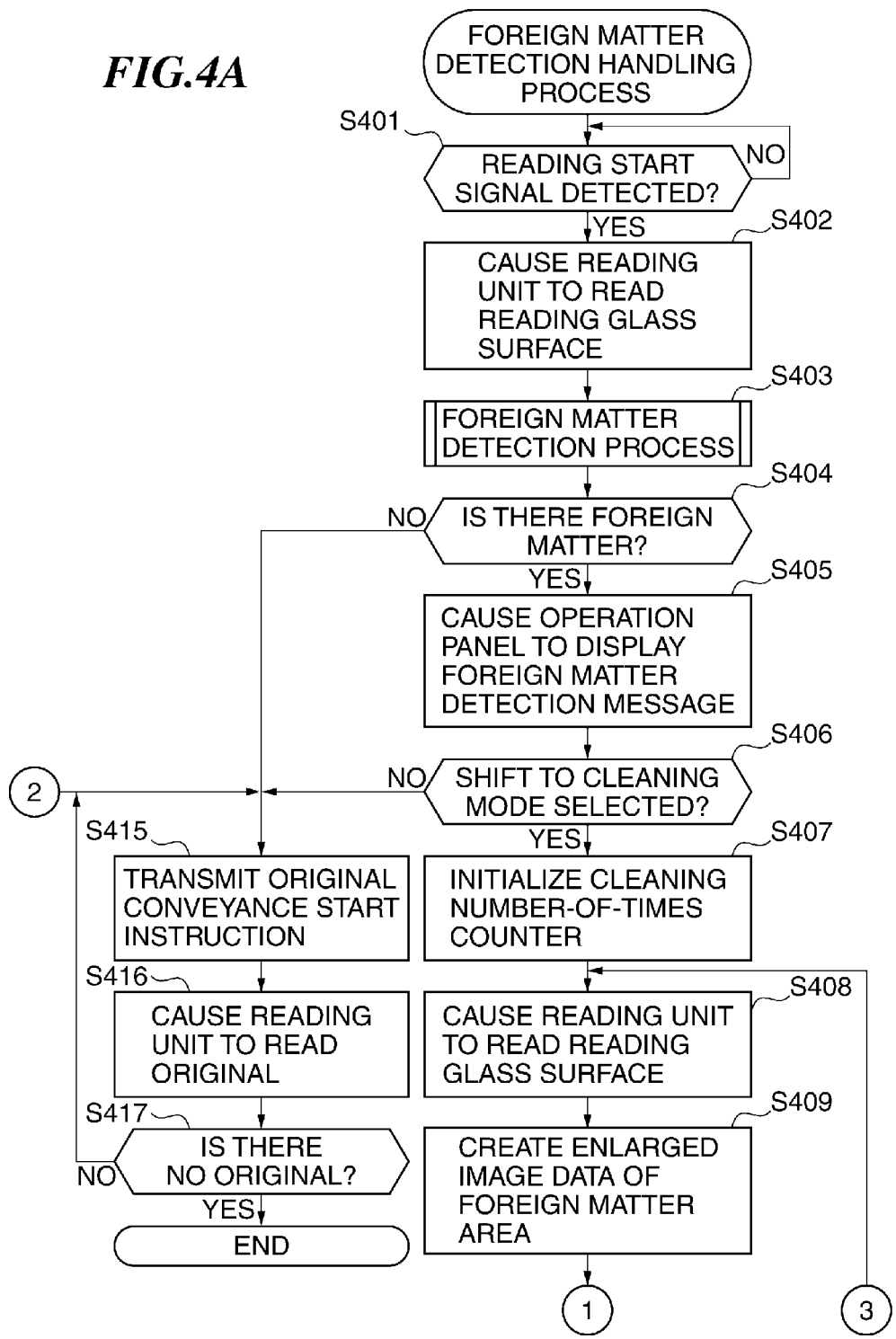
FIGS. 4A and 4B are a flowchart showing the procedures of a foreign matter detection handling process executed by the image reading apparatus.
Figure 4B:
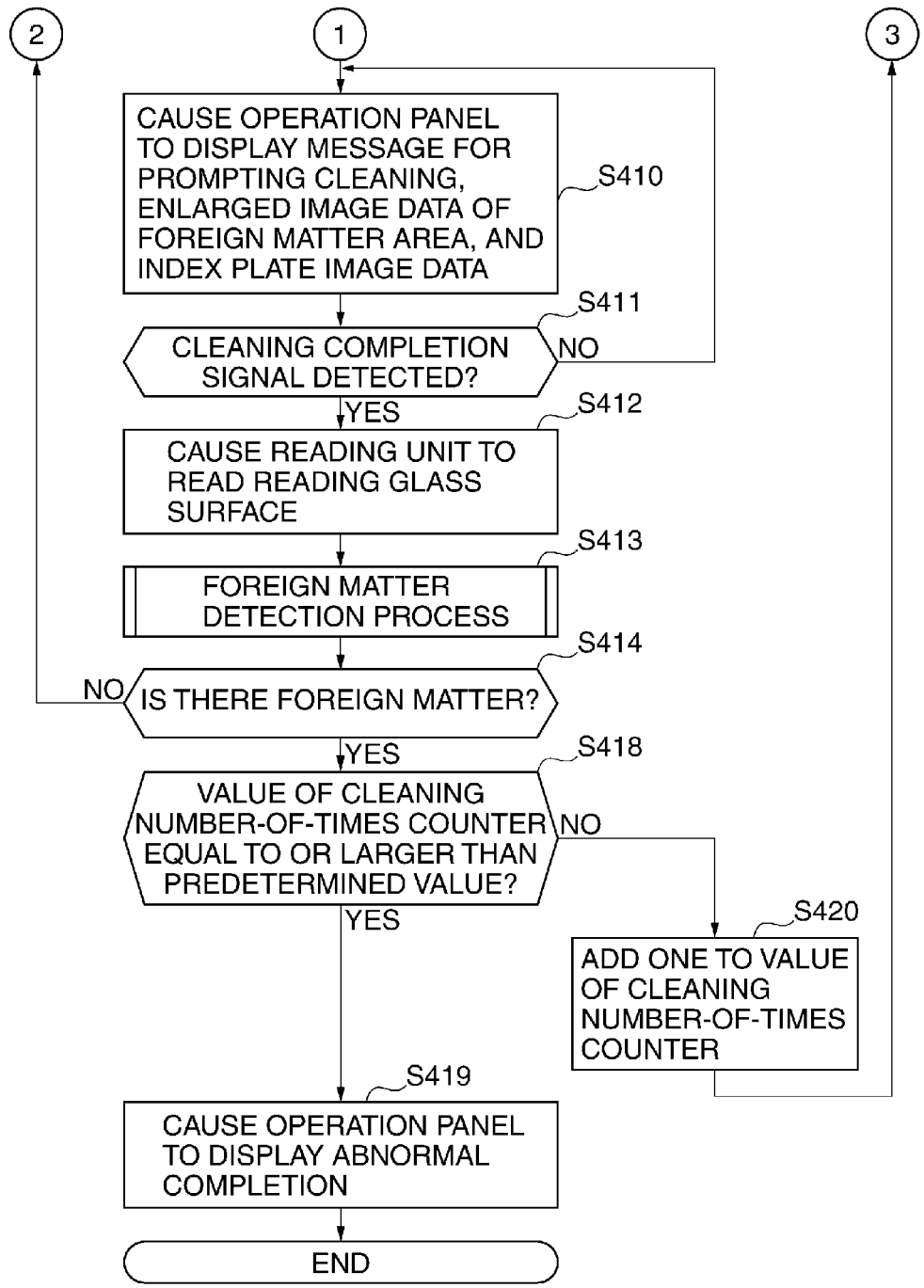

FIGS. 4A and 4B shows in flowchart the procedures of a foreign matter detection handling process executed by the image reading apparatus.

The foreign matter detection handling process is started when the power of the image reading apparatus is turned on. The CPU 302 determines whether or not a reading start signal from the operation panel 306 is detected (step S401). If the reading start signal is detected (YES to step S401), the flow proceeds to step S402.

When the flow proceeds to step S402, i.e., when the reading start signal is detected, an original conveyance operation is not started as yet. In step S402, the CPU 302 causes the reading unit 125 to read, a plural number of times, a portion of the surface of the reading glass 116 corresponding to the reading position in flow reading while rotating the conveyance roller 112, and stores the resultant image data into the RAM 303.

Next, the CPU 302 reads the image data stored in the RAM 303, performs a foreign matter detection process based on the image data as will be described in detail later (step S403), and determines whether or not there is foreign matter on the surface of the reading glass 116 (step S404).

If determined that there is no foreign matter on the surface of the reading glass 116 (NO to step S404), the CPU 302 transmits an original conveyance start instruction to the conveyance controller 305 to start conveyance of originals placed on the original tray 104 (step S415), and causes the reading unit 125 to read an image of an original conveyed to the reading position in flow reading (step S416).

Next, the CPU 302 determines whether or not there is no next original on the original tray 104 (step S417). If no next original is present (YES to step S417), the reading operation is completed. If there is the next original (NO to step S417), the flow returns to step S415. In other words, the original image reading is repeated until there is no original on the original tray 104.

If determined that there is foreign matter on the surface of the reading glass 116 (YES to step S404), the CPU 302 causes the RAM 303 to store main scanning direction position data based on which it has been determined that there is foreign matter (hereinafter, referred to as the foreign matter position data), and causes the operation panel 306 to display a message stating that foreign matter has been detected and a message for prompting selection of whether or not to make a shift to a cleaning mode (step S405).

The CPU 302 determines based on a user's instruction given via the operation panel 306 whether or not a shift to the cleaning mode is selected (step S406). If a shift to the cleaning mode is not selected (NO to step S406), the flow proceeds to step S415 where the normal original reading operation is performed as described above.

On the other hand, if a shift to the cleaning mode is selected (YES to step S406), the CPU 302 initializes a cleaning number-of-times counter (step S407), and causes the reading unit 125 to read, in the fixed-reading mode, the portion of the surface of the reading glass 116 that corresponds to the reading position in flow reading (step S408).

More specifically, the reading unit 125 reads the entire surface of the reading glass 116, while moving in the sub-scanning direction. The CPU 302 receives image data of one line at intervals of a predetermined sampling time (hereinafter, referred to as the sampling time Tv) and stores the image data into the RAM 303, while supplying a control signal to the reading unit controller 304 to move the reading unit 125. The sampling time Tv [sec] can be obtained according to formula (1) given below.

$$Tv=(0.0254/Fv)\div Rv \qquad (1)$$

In formula (1), Fv [m/sec] represents a moving speed of the reading unit 125, Rv [dpi] represents a sub-scanning resolution, and a value of 0.0254 represents an inch-meter conversion factor.

A number of captured lines, Mv, can be obtained according to formula (2) given below.

$$Mv=(Lv/Fv)\div Tv \qquad (2)$$

In formula (2), Tv represents the sampling time, Lv [m] represents a sub-scanning direction length of the portion of the surface of the reading glass 116 corresponding to the reading position in flow reading, and Fv represents the moving speed of the reading unit 125. The number of captured lines, Mv, is a positive integer. If a right-hand value of formula (2) includes a fraction of less than 1, the fraction is rounded up to 1.

In step S409, the CPU 302 extracts, from the image data read in step S408, image data corresponding to the foreign matter position data stored into the RAM 303 instep S405, thereby creating enlarged bitmap image data of foreign matter and foreign matter area, which will be referred to as the enlarged image data of foreign matter area (step S409). The CPU 302 also calculates a position on the main scanning index plate 201 corresponding to the foreign matter position based on the foreign matter position data, and creates main scanning index plate image data based on the calculated position.

The main scanning index plate image data includes data that represents one first partial area in which foreign matter is present among the first partial areas A-J of the surface of the reading glass 116 and includes data that represents a foreign matter image display range in the main scanning direction. The foreign matter image display range is set so as to include a position of one auxiliary scale where the foreign matter is present and positions of four auxiliary scales adjacent to both sides of the one auxiliary scale.

The number of pixels ΔNh that are present between adjacent auxiliary scales in the main scanning index plate image data can be obtained according to formula (3) given below.

$$\Delta Nh=Nh\div(Ds\times Dm) \qquad (3)$$

In formula (3), Nh represents the number of pixels corresponding to the entire main scanning direction area of the surface of the reading glass 116, Dm represents the number of divisions of the entire main scanning direction area (i.e., the number of the first partial areas or the number of the main scales), and Ds represents the number of divisions between adjacent partial areas (i.e., the number of divisions of each partial area or the number of the auxiliary scales concerned). Values of Nh, Ds, and Dm are decided so that ΔNh becomes a positive integer.

The one first partial area where the foreign matter is present among the first partial areas A-J of the surface of the reading glass 116 can be obtained from an integer part of a quotient of formula (4) given below. In formula (4), Xp represents the foreign matter position (pixel order) in the main scanning direction, which is indicated by the foreign matter position data. The position of the one auxiliary scale where the foreign matter is present can be obtained from an integer part of a quotient of formula (5) given below. In formula (5), R represents a fraction part of the quotient of formula (4).

$$Xp\div(\Delta Nh\times Dm) \qquad (4)$$

$$R\div(\Delta Nh\times Ds) \qquad (5)$$

In a case, for example, that the number of pixels, Nh, corresponding to the entire main scanning direction area is 7700, the number of divisions of the entire main scanning direction area, Dm, is 10, the number of divisions between adjacent partial areas, Ds, is 7, and the foreign matter is detected at the 5800-th pixel, the number of pixels, ΔNh, is determined as 110 according to formula (3). The integer part of the quotient of formula (4) has a value of 5, and the integer part of the quotient of formula (5) has a value of 2.

In that case, the main scanning index plate image data indicating that the foreign matter is present in the fifth first partial area F and also indicating the foreign matter image display range which includes positions of the zero-th to fourth auxiliary scales for the first partial area F is generated in step S409.

A scaling factor Ah for generating the enlarged image data in step S409 can be obtained according to formula (6) given below.

$$Ah=Ny\div(5\times\Delta Nh)=Ahn\div Ahd \qquad (6)$$

In formula (6), Ny represents the number of pixels of an enlarged image in the main scanning direction that is displayed on the operation panel 306, and Ahn and Ahd respectively represent an enlargement scale factor and a reduction scale factor to achieve scaling with the scaling factor Ah.

To achieve the scaling with the scaling factor Ah, enlargement is first performed using the enlargement scale factor Ahn. To this end, image data is read from the RAM 303 the number of times, Ahn, per each line and the number times, Ahd, per each pixel, and the read image is temporarily stored into the RAM 303. Next, 1/Ahd reduction is performed using the reduction scale factor Ahd. More specifically, the image data temporarily stored in the RAM 303 is read for every Ahd lines and for every Ahd pixels from the RAM 303, and the read image data is stored as the enlarged image data into the RAM 303.

Figure 7A:
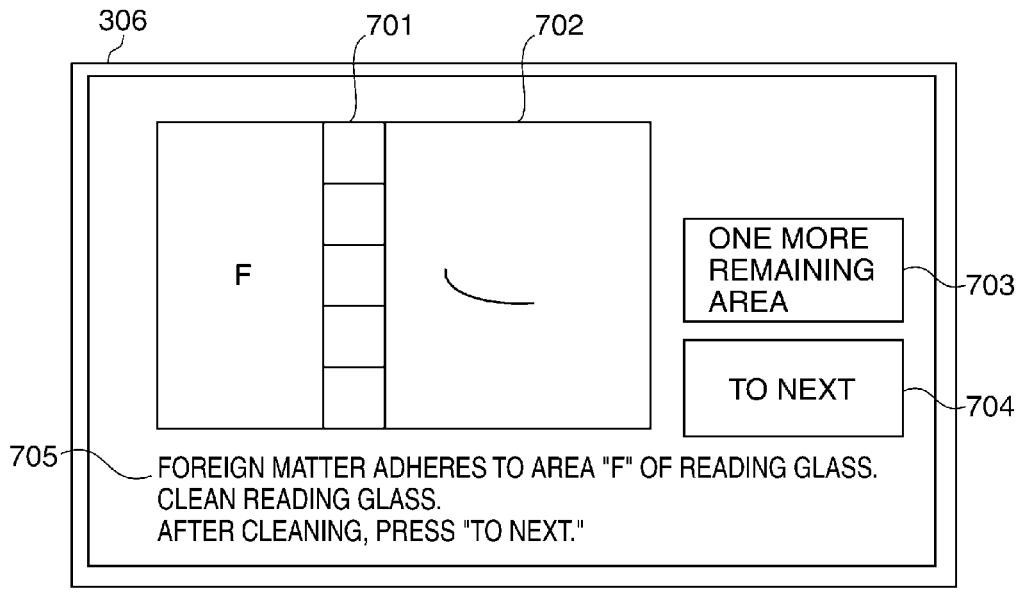
FIGS. 7A and 7B are views showing an example of display of data and a message provided on an operation panel when foreign matter is detected in the foreign matter detection handling process shown in FIGS. 4A and 4B.
Figure 7B:
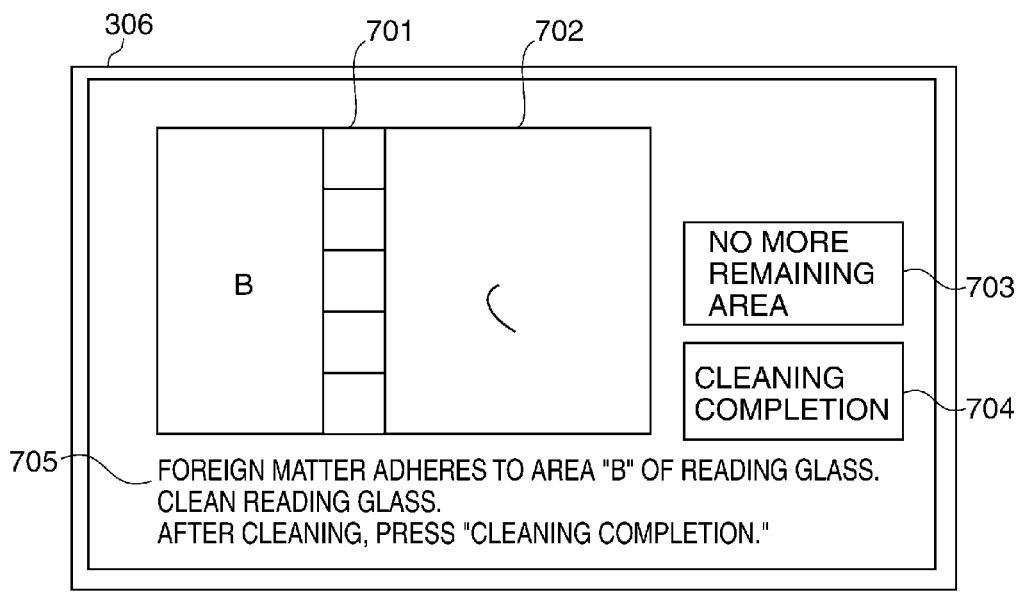

Next, the CPU 302 causes the operation panel 306 to display a message that prompts the user to perform cleaning and to display the enlarged image data and the main scanning index plate image data that are generated in step S409, as exemplarily shown in FIGS. 7A and 7B (step S410). Then, the CPU 302 determines whether or not it detects a cleaning completion signal that is supplied from the operation panel 306 when an instruction indicating completion of cleaning is input by the user via the operation panel 306 (step S411).

When detecting the cleaning completion signal (YES to step S411), the CPU 302 causes the reading unit 125 to read the portion of the surface of the reading glass 116 corresponding to the reading position in flow reading, and stores image data into the RAM 303 (step S412), as in step S402. Then, the CPU 302 performs a foreign matter detection process based on the image data stored in the RAM. 303 (step S413), as in step S403, and determines whether or not there is foreign matter on the surface of the reading glass 116 (step S414).

If determined that there is no foreign matter on the surface of the reading glass 116 (NO to step S414), the flow proceeds to step S415. On the other hand, if determined that there is foreign matter on the surface of the reading glass 116 (YES to step S414), the flow proceeds to step S418.

In step S418, the CPU 302 determines whether or not a value of the cleaning number-of-times counter is equal to or larger than a predetermined value. If the value of the cleaning number-of-times counter is equal to or larger than the predetermined value (YES to step S418), the CPU 302 determines that foreign matter cannot be removed even if a reading glass cleaning operation will be repeated, causes the operation panel 306 to display abnormal completion, and stops operations of respective parts of the apparatus (step S419), whereupon the present process is completed.

On the other hand, if the value of the cleaning number-of-times counter is smaller than the predetermined value (NO to step S418), the CPU 302 adds 1 to the value of the cleaning number-of-times counter (step S420), and returns to step S408.

Figure 5:
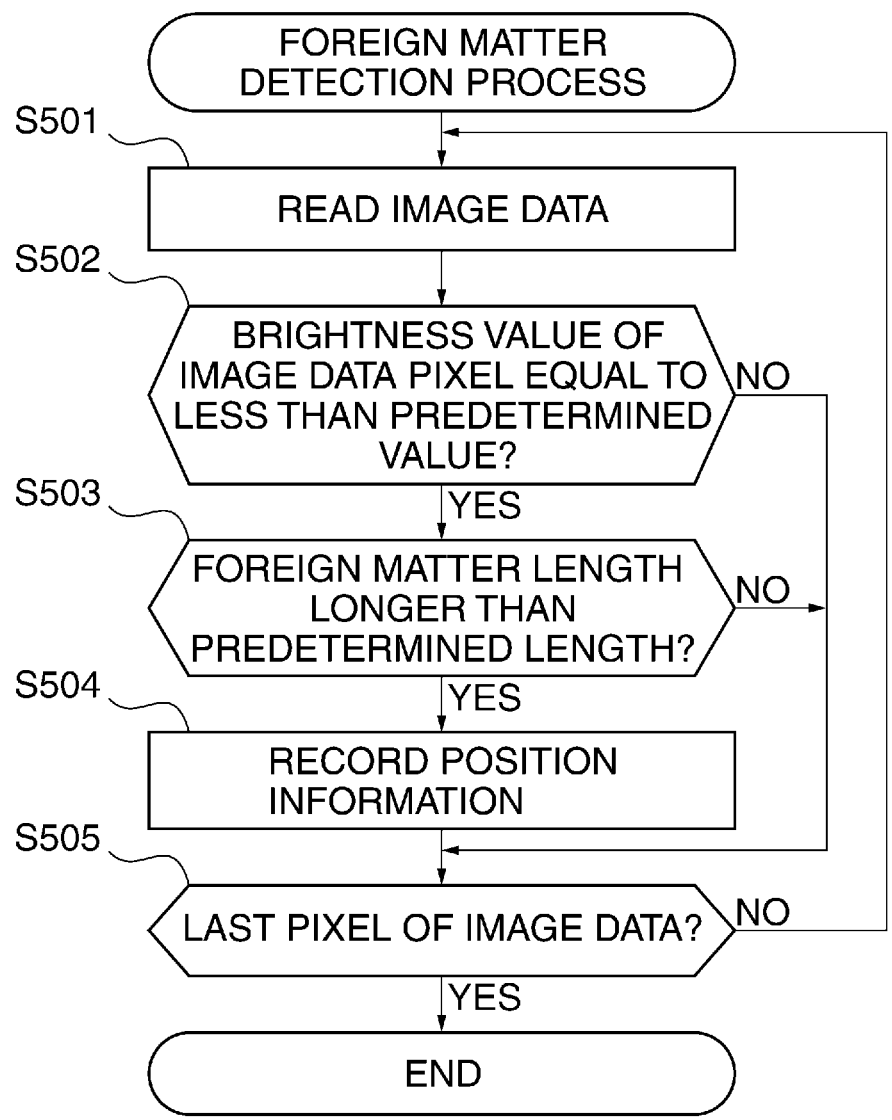
FIG. 5 is a flowchart showing procedures of a foreign matter detection process executed by the image reading apparatus.

FIG. 5 shows in flowchart the procedures of the foreign matter detection process executed in steps S403 and S413 in the foreign matter detection handling process shown in FIGS. 4A and 4B.

At start of the foreign matter detection process, the CPU 302 reads image data, pixel by pixel, from the RAM 303 (step S501), and compares each of brightness values of the read image data with a predetermined brightness value to thereby determine whether or not there is foreign matter at a position corresponding to the read image data (step S502).

Figure 6A:
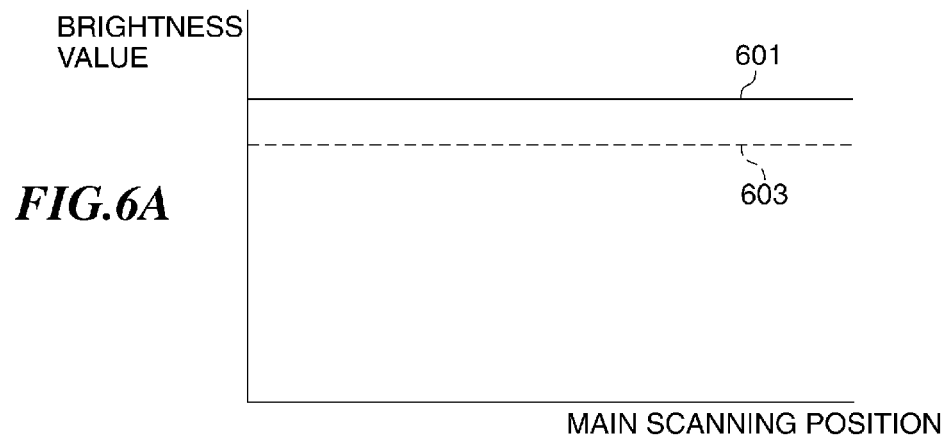
FIGS. 6A and 6B are views showing how the presence or absence of foreign matter is determined.

In the image reading apparatus of this embodiment, the conveyance roller 112 is constituted by a raw material which is white in color. Thus, if no foreign matter is present on the portion of the surface of the reading glass 116 corresponding to the reading position in flow reading, a brightness value of reflection light from the conveyance roller 112 on which light from the light sources 117, 118 is irradiated becomes high as shown by reference numeral 601 in FIG. 6A. On the other hand, if foreign matter is adhered to the surface of the reading glass 116, light irradiated from the light sources 117, 118 to the conveyance roller 112 is intercepted by the foreign matter. As a result, the strength of reflection light from the conveyance roller 112 is weakened, so that the brightness value of the reflection light becomes low at a pixel region where the foreign matter is present as shown by reference numeral 602 in FIG. 6B.

Figure 6B:

Thus, if the brightness value of read image data is higher than a predetermined brightness value 603 (NO to step S502), which is set to be lower than the brightness value 601 as shown in FIG. 6B, the CPU 302 determines that there is no foreign matter at a position corresponding to the read image data, and proceeds to step S505. On the other hand, if the brightness value of the read image data is equal to or lower than the predetermined brightness value 603 (YES to step S502), the CPU 302 determines that there is foreign matter at the position corresponding to the read image data, and proceeds to step S503.

Figure 6C:
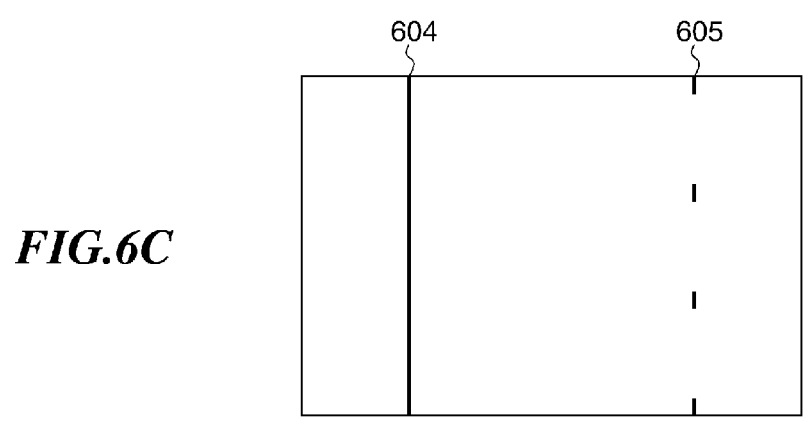
FIG. 6C is a view showing how a position to which foreign matter is adhered is determined.

In step S503, the CPU 302 determines whether or not the detected foreign matter has a sub-scanning direction length longer than a predetermined length, thereby determining whether the detected foreign matter is adhered to the reading glass 116 or to the conveyance roller 112. If the foreign matter is adhered to the reading glass 116 or to the conveyance roller 112, a streak is produced in the sub-scanning direction in image data that is read in the flow-reading mode. More specifically, if the foreign matter is adhered to the surface of the reading glass 116, a continuous streak that is long in sub-scanning direction length as shown by a solid line 604 in FIG. 6C is produced in the image data. On the other hand, if the foreign matter is adhered to the conveyance roller 112, a portion of the conveyance roller to which the foreign matter is adhered moves with rotation of the conveyance roller, and therefore an intermittent streak that is short in sub-scanning direction length as shown by a dotted line 605 in FIG. 6C is produced in the image data.

If the detected foreign matter has a sub-scanning direction length longer than the predetermined length (YES to step S503), the CPU 302 determines that the foreign matter is adhered to the reading glass 116, and proceeds to step S504. On the other hand, if the detected foreign matter has a sub-scanning direction length equal to or shorter than the predetermined length (NO to step S503), the CPU 302 determines that the foreign matter is adhered to the conveyance roller 112, and proceeds to step S505.

In step S504, the CPU 302 records, into the RAM 303, position information that represents a main scanning direction position where the foreign matter is present. Next, the CPU 302 determines whether the current pixel of the image data is the last pixel of the image data (step S505). If the answer to step S505 is NO, the flow returns to step S501. On the other hand, if the answer to step S505 is YES, the foreign matter detection process is completed.

FIGS. 7A and 7B show an example of data display provided on the operation panel 306 in step S410 of the foreign matter detection handling process shown in FIGS. 4A and 4B.

The operation panel 306 of the image reading apparatus of this embodiment has a display part constituted by a touch panel that is capable of displaying various information and capable of enabling the user to operate various parts of the image reading apparatus. On the display part of the operation panel 306, there can be displayed display fields 701-705 for displaying main scanning index plate image data, enlarged image data of foreign matter area, the number of uncleaned foreign matter areas, an operation button, and a message for prompting cleaning, respectively.

The number of uncleaned foreign matter areas represents a number of remaining foreign matter areas for which cleaning is not completed. In the operation button display field 704, a "to next" button is displayed as shown in FIG. 7A, if the number of uncleaned foreign matter areas is not equal to zero, whereas a cleaning completion button is displayed as shown in FIG. 7B, if the number of uncleaned foreign matter areas is zero.

Figure 8:
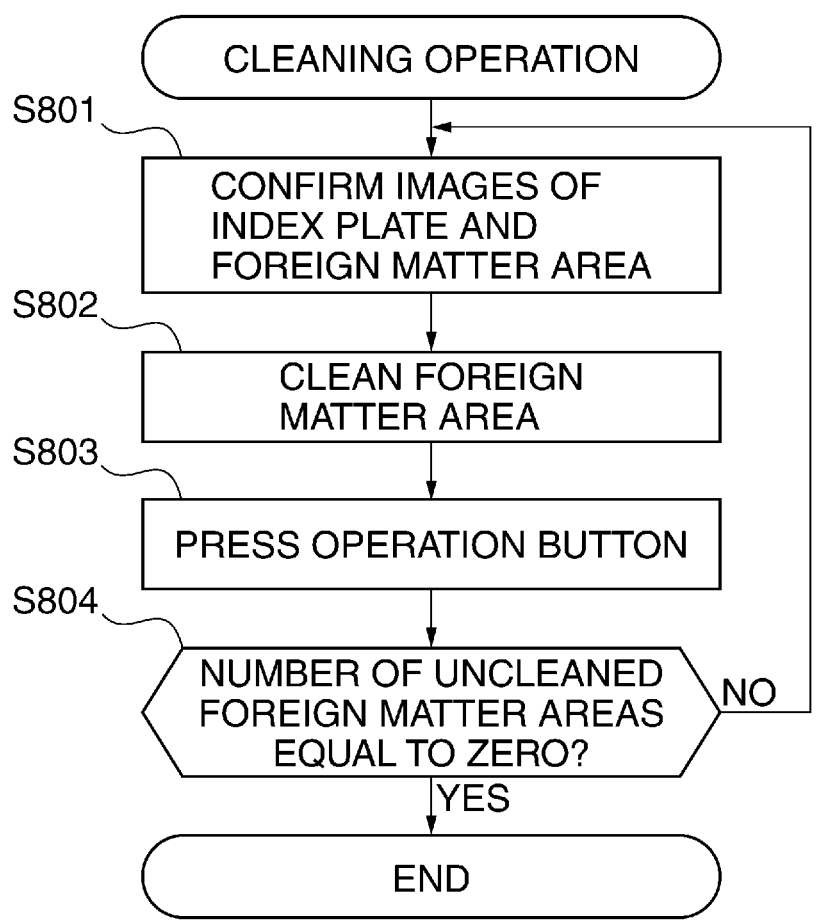
FIG. 8 is a flowchart showing procedures of a cleaning operation performed by a user.

FIG. 8 shows in flowchart the procedures of a cleaning operation performed by a user.

At start of the cleaning operation, the user confirms main scanning index plate image data as position information and enlarged image data of foreign matter area that are displayed in the display fields 701, 702 of the operation panel 306 (step S801), and cleans the foreign matter area on the reading glass 116 (step S802). Upon completion of cleaning the foreign matter area, the user presses the button displayed in the operation button display field 704 (step S803).

Next, the user confirms whether or not the number of uncleaned foreign matter areas displayed in the display field 703 is equal to zero, thereby determining whether or not a remaining uncleaned foreign matter is present. If the number of uncleaned foreign matter areas is zero (YES to step S804), the user completes the cleaning operation. On the other hand, if the number of uncleaned foreign matter areas is not equal to zero (NO to step S804), the user returns to step S801 to continue the cleaning operation.

In short, according to the image reading apparatus of this embodiment, the presence or absence of foreign matter on at least the surface of the reading glass 116 is detected when the reading of originals in flow-reading mode is started in response to a reading start signal input from the operation panel 306.

To this end, light is irradiated to the reading glass 116 and to the second conveyance roller 112 which is white in color and which is being rotated, and reflection light from the roller 112 is received by the line sensor 123. Then, a reading signal, which is image data in the reading range in flow reading that is set along the main scanning direction, is output from the line sensor 123. Next, a brightness value of the image data is compared with a predetermined brightness value on a per pixel basis, thereby detecting the presence or absence of foreign matter at each pixel of the image data.

If foreign matter is detected, a main scanning direction area where the foreign matter is present is identified based on a pixel position of the image data where the foreign matter is detected. Next, a part, either the reading glass 116 or the conveyance roller 112, to which the foreign matter is adhered is determined. If a continuous streak is present in the image data, it is determined that the foreign matter is adhered to the surface of the reading glass 116. On the other hand, if an intermittent streak is present in the image data, it is determined that the foreign matter is adhered to the conveyance roller 112.

If determined that the foreign matter is adhered to the surface of the reading glass 116, a portion of the surface of the reading glass 116 corresponding to the reading position in flow reading is read by the reading unit 125 in the fixed-reading mode. Then, based on the image data read by the reading unit 125, enlarged bitmap image data of foreign matter area is generated. Furthermore, from foreign matter position data, a corresponding position on the main scanning index plate 201 is calculated, and main scanning index plate image data is generated.

Next, the main scanning index plate image data, the enlarged image data of foreign matter area, the number of uncleaned foreign matter areas, the operation button, and the message for prompting cleaning are displayed in the display fields 701-705 of the operation panel 306. As a result, the user can quickly visually recognize the position and shape of the foreign matter and can easily perform a foreign matter cleaning operation.

Second Embodiment

Next, a description will be given of an image reading apparatus according to a second embodiment of this invention.

The image reading apparatus of this embodiment is configured to detect whether or not foreign matter is present when an original image is read in the fixed-reading mode. In the case of reading an original image in the fixed-reading mode, the area of the reading glass 116 for which the foreign matter detection is to be performed becomes large. Accordingly, the productivity is noticeably lowered, if the foreign matter detection is automatically performed each time an original image is read. Thus, the image reading apparatus of this embodiment is configured to perform the foreign matter detection when a cleaning mode is selected by the user.

It should be noted that the image reading apparatus of this embodiment is the same in basic construction as that of the first embodiment, and a description thereof will be omitted.

FIG. 9 shows in plan view a main scanning index plate and a sub-scanning index plate that are provided in the image reading apparatus of this embodiment.

As shown in FIG. 9, the main scanning index plate 201 is disposed along the short edge of the reading glass 116 on the side close to the reading position in flow reading and extends in the main scanning direction, as in the first embodiment. In addition, a sub-scanning index plate 901 is disposed adjacent to a long edge of the reading glass 116 and extends in the sub-scanning direction.

The sub-scanning index plate 901 is provided with main scales that equally divide the entire sub-scanning direction area of the reading glass 116 into a plurality of (e.g., fourteen) second partial areas and auxiliary scales that subdivide the partial areas. It should be noted that a position index array (e.g., main and auxiliary scales) can be formed on the reading glass 116 instead of providing the main scanning index plate 201 and the sub-scanning index plate 901.

Figure 10B:
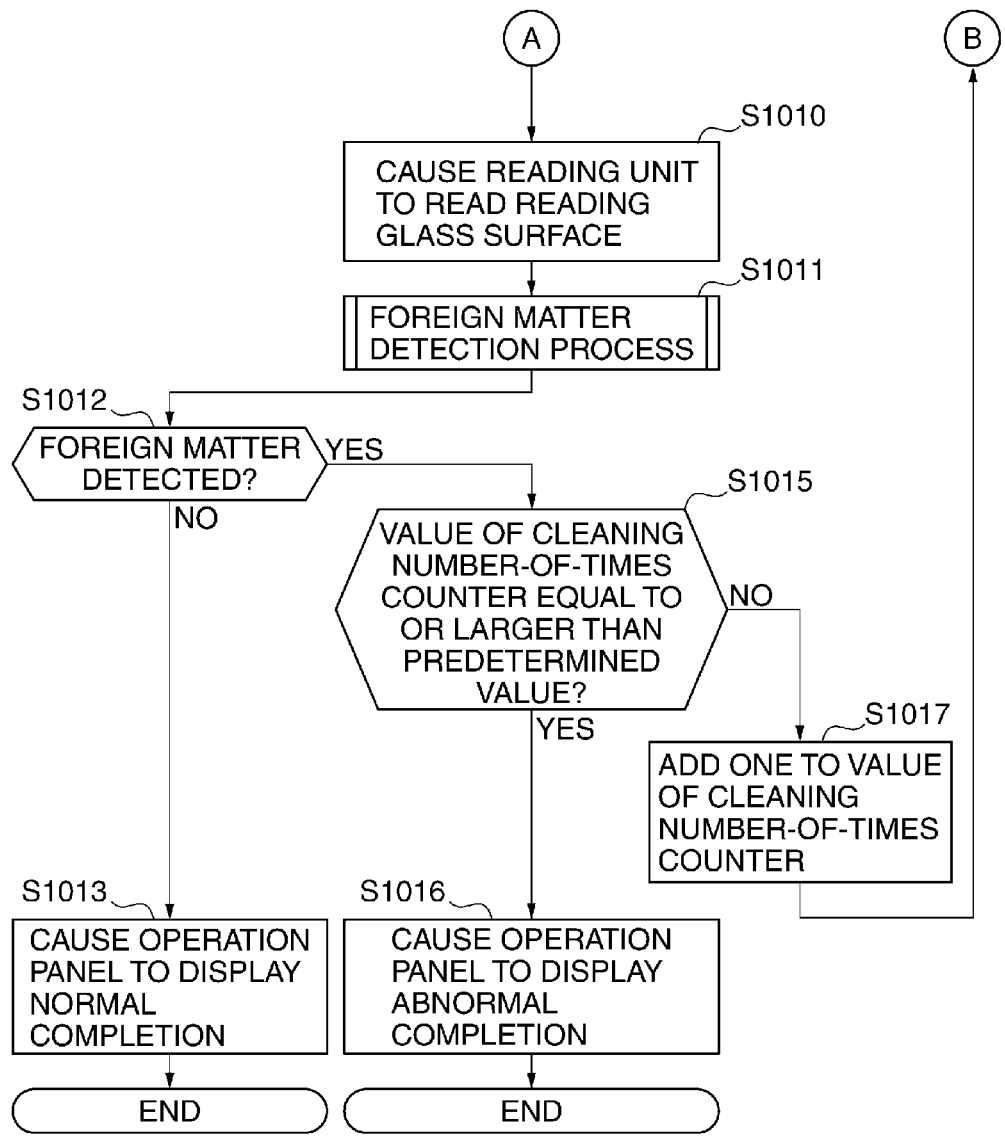

FIGS. 10A and 10B show in flowchart the procedures of a cleaning mode process executed by the CPU 302 of the image reading apparatus of the second embodiment.

When the power of the image reading apparatus is turned on, the cleaning mode process is started. The CPU 302 determines whether or not it detects a cleaning start signal supplied from the operation panel 306 (step S1001).

When detecting the cleaning start signal (YES to step S1001), the CPU 302 supplies a control signal to the reading unit controller 304 to move the reading unit 125, inputs a read signal from the A/D converter 301 to acquire image data of the surface of the reading glass 116 that is read by the reading unit 125 in the fixed-reading mode, and stores the acquired image data into the RAM 303 (step S1002).

Next, the CPU 302 sequentially reads the image data stored in the RAM 303, performs a foreign matter detection process based on the image data (step S1003), and determines whether or not there is foreign matter on the surface of the reading glass 116 (step S1004). If there is no foreign matter on the surface of the reading glass 116 (NO to step S1004), the CPU 302 causes the operation panel 306 to display on its display part a message stating that no foreign matter has been detected (step S1014), and completes the present process.

Figure 11:
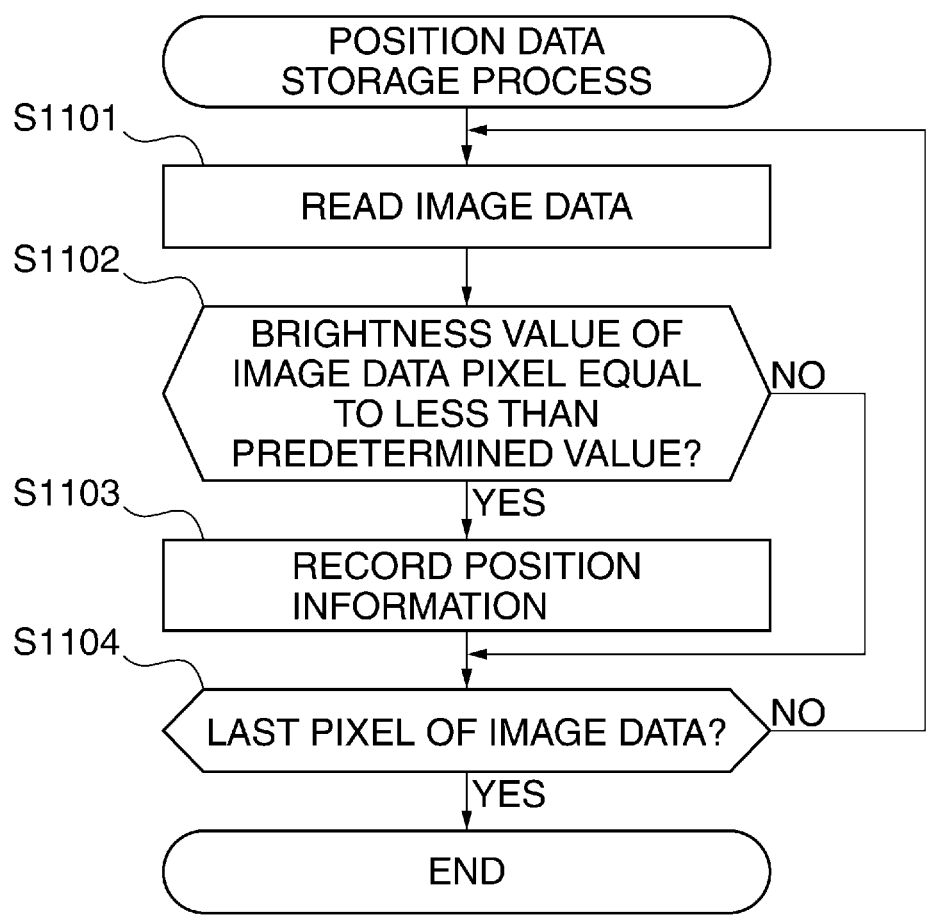
FIG. 11 is a flowchart showing procedures of a position data storage process executed in the cleaning mode process shown in FIGS. 10A and 10B.

On the other hand, if there is foreign matter on the surface of the reading glass 116 (YES to step S1004), the CPU 302 performs a position data storage process for storing relevant position data into the RAM 303 according to procedures shown in FIG. 11. Furthermore, the CPU 302 causes the operation panel 306 to display on its display part a message stating that foreign matter has been detected (step S1005), and initializes the cleaning number-of-times counter (step S1006).

Next, the CPU 302 reads from the RAM 303 foreign matter position data and the image data (which is read in step S1002), and generates enlarged bitmap image data of foreign matter area. Furthermore, as in the first embodiment, the CPU 302 calculates a main scanning direction position and a sub-scanning direction position of the foreign matter from the foreign matter position data, and generates index plate image data that is position information to be displayed on the display part of the operation panel 306 (step S1007).

Figure 12A:
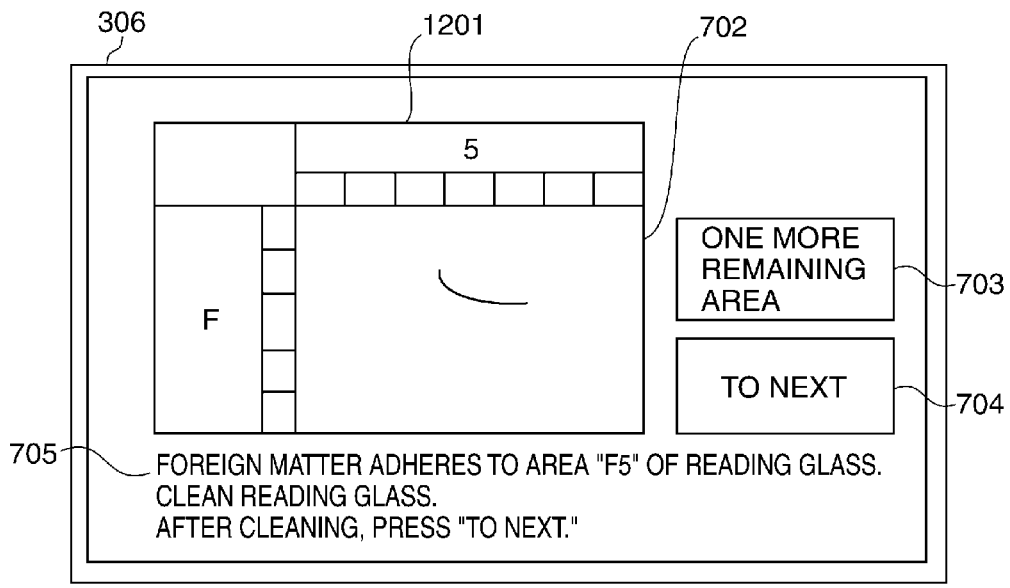
FIGS. 12A and 12B are views showing an example of display of a message and data provided on the operation panel when foreign matter is detected in the cleaning mode process shown in FIGS. 10A and 10B.
Figure 12B:
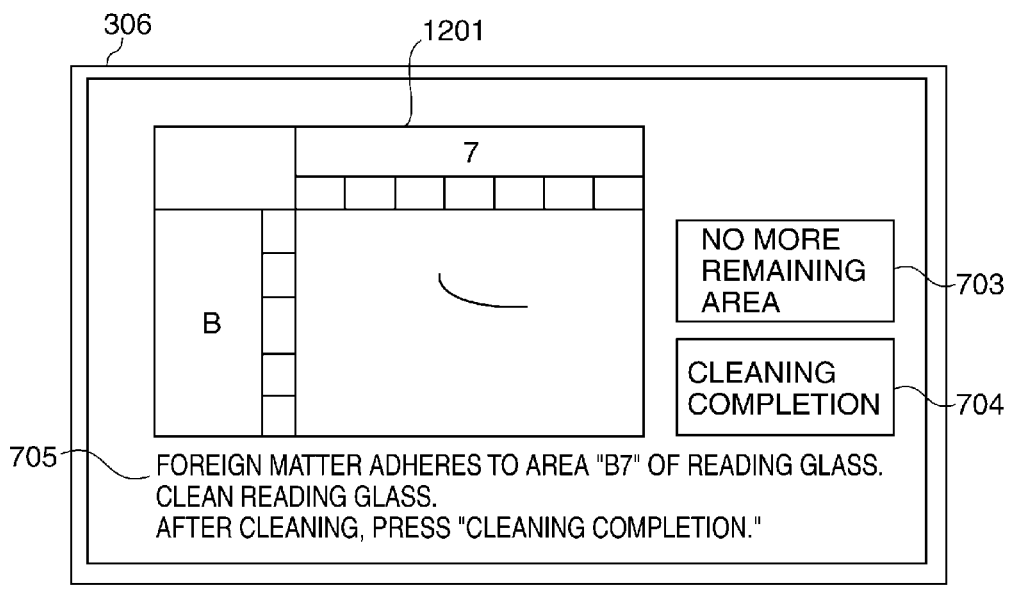

Next, the CPU 302 causes the operation panel 306 to display a message for prompting cleaning and to display the enlarged bitmap image data of foreign matter area and the index plate image data that are generated in step S1007 as exemplarily shown in FIG. 12A or 12B (step S1008). Then, the CPU 302 determines whether or not it detects a cleaning completion signal supplied from the operation panel 306 (step S1009).

When detecting the cleaning completion signal, the CPU 302 causes the reading unit 125 to read the surface of the reading glass 116 (step S1010), performs a foreign matter detection process (step S1011), and determines whether or not foreign matter has been detected (step S1012).

If foreign matter has not been detected (NO to step S1012), the CPU 302 causes the operation panel 306 to display a message stating that cleaning has normally been completed (step S1013), and completes the cleaning mode process.

If foreign matter has been detected (YES to step S1012), the CPU 302 determines whether or not a value of the cleaning number-of-times counter is equal to or larger than a predetermined value (step S1015). If the value of the cleaning number-of-times counter is equal to or larger than the predetermined value (YES to step S1015), the CPU 302 determines that foreign matter cannot be removed even if the reading glass cleaning operation will be repeated, causes the operation panel 306 to display abnormal completion, and stops operations of respective parts of the apparatus (step S1016). Then, the cleaning mode process is completed.

On the other hand, if the value of the cleaning number-of-times counter is smaller than the predetermined value (NO to step S1015), the CPU 302 adds 1 to the value of the cleaning number-of-times counter (step S1017), and returns to step S1007. In other words, the message for prompting cleaning is repeatedly displayed until foreign matter becomes undetected or until the number of times of cleaning reaches a predetermined number of times.

FIG. 11 shows in flowchart the procedures of the position data storage process executed in step S1005 of the cleaning mode process shown in FIGS. 10A and 10B.

At start of the position data storage process, the CPU 302 reads image data from the RAM 303 pixel by pixel (step S1101), and determines whether or not a brightness value of the read image data is equal to or smaller than a predetermined brightness value (step S1102). The predetermined brightness value is determined in advance based on a brightness value obtained when a white color platen (not shown) is read, which is disposed at a bottom face of the ADF 102 so as to face the reading glass 116.

If the brightness value of the image data read in step S1101 is larger than the predetermined brightness value, the CPU 302 determines that there is no foreign matter and proceeds to step S1104.

On the other hand, if the brightness value of the image data is equal to or smaller than the predetermined brightness value, the CPU 302 determines that there is foreign matter and records, into the RAM 303, position information indicating a position where the foreign matter is present (step S1103), and determines whether or not the current pixel of the image data is the last pixel (step S1104).

If determined that the image data has not been read to the end (NO to step S1104), the flow returns to step S1101. On the other hand, if determined that the image data has been read to the end (YES to step S1140), the position data storage process is completed.

FIGS. 12A and 12B show an example of display of a message and data provided on the operation panel 306 in step S1008 of the cleaning mode process shown in FIGS. 10A and 10B.

The operation panel 306 of the first embodiment has the display fields 701-705 as shown in FIGS. 7A and 7B, and main scanning index plate image data is displayed in the display field 701. On the other hand, the operation panel 306 of this embodiment has the display fields 1201 and 702-705, and main scanning index plate image data and sub-scanning index plate image data, which are position information, are displayed in the display field 1201. It should be noted that this embodiment is basically the same in construction, function, and advantage as those of the first embodiment.

In short, according to the image reading apparatus of this embodiment, foreign matter detection is performed when the cleaning mode is selected, and one or more foreign matter areas on the surface of the reading glass 116 are identified two-dimensionally.

More specifically, in the foreign matter detection in the cleaning mode, the surface of the reading glass 116 is read by the reading unit 125 in the fixed-reading mode to thereby obtain image data. Then, a brightness value of each pixel of the image data is compared with the predetermined brightness value that corresponds to a brightness value obtained when the white color platen is read, whereby the presence or absence of foreign matter on the surface of the reading glass 116 is detected.

If foreign matter is detected, a main scanning direction area where the foreign matter is present is identified based on a pixel position of the image data where the foreign matter is detected, and a sub-scanning direction area where the foreign matter is present is identified based on a moving position of the reading unit 125 at a timing where the foreign matter is detected.

If determined that the foreign matter is adhered to the surface of the reading glass 116, the reading glass 116 is read by the reading unit 125, and enlarged bitmap image data of foreign matter area is generated based on the resultant image data. Furthermore, from foreign matter position data, a corresponding position on the main scanning index plate 201 and a corresponding position on the sub-scanning index plate 901 are calculated, and image data of the scanning index plates is generated.

Next, the image data of the scanning index plates, the enlarged image data of foreign matter, the number of uncleaned foreign matter areas, the operation button, and the message for prompting cleaning are displayed in the display fields 1201 and 702-705 of the operation panel 306. In the display field 1201, position indexes that respectively indicate the main scanning direction area and the sub-scanning direction area where the foreign matter is present are displayed, whereby the foreign matter area is indicated two-dimensionally. As a result, the user can quickly visually recognize the position, shape, and size of the foreign matter, can easily recognize the cleaning object, and can efficiently perform a foreign matter cleaning operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-009252, filed Jan. 22, 2013, which is hereby incorporated by reference herein in its entirety.

What is claimed is:
1. A document reading apparatus comprising:
a document conveyor configured to convey a document;
a reader configured to read the document conveyed by said document conveyor on a reading glass and configured to output image data;
a foreign matter detector configured to detect foreign matter on the reading glass based on the image data output from said reader in a state that there is no document on the reading glass; and
a display device configured to provide a display for prompting a user to clean the reading glass and display an image based on the image data output from said reader in the state, the displayed image showing a position of the detected foreign matter on the reading glass.

2. The document reading apparatus according to claim 1, wherein said reader reads an original being conveyed on the reading glass by said document conveyor.

3. The document reading apparatus according to claim 2, wherein in a case where foreign matter is detected by said foreign matter detector after the reading glass has been cleaned, said display device displays a message for prompting cleaning of the reading glass.

4. The document reading apparatus according to claim 3, wherein in a case where a number of times of foreign matter detection exceeds a predetermined number of times, said display device displays abnormal completion.

5. The document reading apparatus according to claim 1, wherein in a case where a remaining uncleaned foreign matter is present, said display device displays a number of uncleaned foreign matter areas.

6. The document reading apparatus according to claim 1, further including:
a signal processing unit configured to generate enlarged image data of foreign matter area based on the image data corresponding to the position of the foreign matter detected by said foreign matter detector and image data of the reading glass read by said reader in a fixed-reading mode,
wherein said display device displays the enlarged image data of foreign matter area generated by said signal processing unit.

7. The document reading apparatus according to claim 1, wherein the display for prompting the user to clean the reading glass and the displayed image corresponding to the position of the detected foreign matter are displayed on the same display device.

8. The document reading apparatus according to claim 1, wherein the display device is configured to display the image corresponding to the position of the detected foreign matter regardless of whether the reading glass is covered or exposed.

9. A document reading apparatus comprising:
a document conveyor configured to convey a document;
a reader configured to read the document conveyed by said document conveyor on a reading glass and configured to output image data;
a foreign matter detector configured to detect foreign matter on the reading glass based on the image data output from said reader in a state that there is no document on the reading glass; and
a display device configured to provide a display for prompting a user to clean the reading glass and display an image based on the image data output from said reader in the state, corresponding to a position of the detected foreign matter,
wherein a position index array having position indexes is provided adjacent to the reading glass, and
said display device displays the image based on a part of the image data corresponding to the position of the detected foreign matter and an image corresponding to the position index corresponding to the position of the detected foreign matter.

10. A document reading apparatus comprising:
a document conveyor configured to convey a document;
a reader configured to read the document conveyed by said document conveyor on a reading glass and configured to output image data;
a foreign matter detector configured to detect foreign matter on the reading glass based on the image data output from said reader in a state that there is no document on the reading glass;
a display device configured to provide a display for prompting a user to clean the reading glass and display an image based on the image data output from said reader in the state, corresponding to a position of the detected foreign matter; and
a main scanning index plate having first scales, as a part of the position indexes, that divide a surface of the reading glass into a plurality of first partial areas in a main scanning direction, said main scanning index plate being disposed adjacent to the reading glass and extending in the main scanning direction,
wherein said foreign matter detector identifies first partial area corresponding to the position of the detected foreign matter from among the plurality of first partial areas, and
said display device displays the image of the detected foreign matter and position information that represents the first partial area, and
wherein the main scanning direction is a longitudinal direction of the reading glass.

11. The document reading apparatus according to claim 10, further including:
a sub-scanning index plate having second scales, as a remaining part of the position indexes, that divide the surface of the reading glass into a plurality of second partial areas in a sub-scanning direction, said sub-scanning index plate being disposed adjacent to the reading glass and extending in the sub-scanning direction,
wherein said foreign matter detector identifies, from among the plurality of first partial areas and the plurality of second partial areas, one first partial area and one second partial area that correspond to the position of the foreign matter detected by said foreign matter detector, and
said display device displays the image of the detected foreign matter and also displays position information that represents the first and second partial areas identified by said foreign matter detector.

12. The document reading apparatus according to claim 10, wherein in a case where foreign matter is detected by said foreign matter detector after the reading glass has been cleaned, said display device displays a message for prompting cleaning of the reading glass.

13. The document reading apparatus according to claim 12, wherein in a case where a number of times of foreign matter detection exceeds a predetermined number of times, said display device displays abnormal completion.

14. A document reading apparatus comprising:
a document conveyor configured to convey a document;
a reader configured to read the document conveyed by said document conveyor on a reading glass and configured to output image data;
a foreign matter detector configured to detect foreign matter on the reading glass based on the image data output from said reader in a state that there is no document on the reading glass;
a display device configured to provide a display for prompting a user to clean the reading glass and display an image based on the image data output from said reader in the state, corresponding to a position of the detected foreign matter; and
a signal processing unit configured to generate enlarged image data of foreign matter area based on the image data corresponding to the position of the foreign matter detected by said foreign matter detector and image data of the reading glass read by said reader in a fixed-reading mode, wherein said display device displays the enlarged image data of foreign matter area generated by said signal processing unit, a position index array having position indexes is provided adjacent to the reading glass, said signal processing unit generates image data of position indexes corresponding to the position of the detected foreign matter based on the image data corresponding to the position of the detected foreign matter, and said display device displays the image data of position indexes generated by said signal processing unit.

* * * * *